US012570240B2

(12) United States Patent
Weinman et al.

(10) Patent No.: US 12,570,240 B2
(45) Date of Patent: Mar. 10, 2026

(54) WASHER FLUID RESERVOIR ASSEMBLY INCLUDING A HOLD FEATURE

(71) Applicant: Honda Motor Co., Ltd., Tokyo (JP)

(72) Inventors: Dakota E. Weinman, Dublin, OH (US); Jesse W. Schlabach, Marysville, OH (US); Timothy J. Rupp, Dublin, OH (US); Babuji K Tamarapoo, Powell, OH (US); Hirofumi Takemoto, Dublin, OH (US); Masaki Kawamura, Tochigi (JP); Oscar A. Caraan, Delaware, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 478 days.

(21) Appl. No.: 18/172,493

(22) Filed: Feb. 22, 2023

(65) Prior Publication Data

US 2024/0278748 A1     Aug. 22, 2024

(51) Int. Cl.
*B60S 1/50* (2006.01)

(52) U.S. Cl.
CPC ...................................... *B60S 1/50* (2013.01)

(58) Field of Classification Search
CPC .......... B60S 1/50; B60S 1/0047; B60S 1/045; F16B 35/005
USPC .............. 280/830; 248/154, 313, 312, 312.1, 248/311.2; 239/130, 284.1
See application file for complete search history.

(56) References Cited

U.S. PATENT DOCUMENTS 3,212,660 A * 10/1965 Adell ......................... B60S 1/50
215/383

| | | | | |
|---|---|---|---|---|
| 3,212,661 A * | 10/1965 | Adell | ......................... | B60S 1/50 |
| | | | | 215/382 |
| 3,213,493 A * | 10/1965 | Chichester | ................ | B60S 1/50 |
| | | | | 248/231.71 |
| 4,444,358 A * | 4/1984 | Spohn | ....................... | B60S 1/50 |
| | | | | D8/395 |
| 5,271,120 A * | 12/1993 | Eustache | ................... | B60S 1/52 |
| | | | | 15/250.1 |
| 12,364,885 B2 * | 7/2025 | Conboy | .................... | A62C 3/00 |
| 12,365,863 B2 * | 7/2025 | Langenfeld | ............ | C12M 23/22 |
| 2004/0142232 A1 * | 7/2004 | Risca | ....................... | B60R 16/04 |
| | | | | 429/100 |
| 2016/0144831 A1 * | 5/2016 | Caillot | .................... | B60S 1/481 |
| | | | | 220/737 |
| 2022/0024419 A1 * | 1/2022 | Ippoliti | .................. | B62D 25/12 |
| 2024/0278748 A1 * | 8/2024 | Weinman | .................. | B60S 1/50 |

(Continued)

FOREIGN PATENT DOCUMENTS

| | | | |
|---|---|---|---|
| JP | 3393569 B2 | 4/2003 | |
| JP | 2004314661 A | 11/2004 | |

(Continued)

OTHER PUBLICATIONS

English translation of KR-20050042324-A. Original version was already provided by the Applicant, in IDS filed Feb. 22, 2023 (Year: 2005).*

*Primary Examiner* — Valentin Neacsu

(74) *Attorney, Agent, or Firm* — Plumsea Law Group, LLC

(57) ABSTRACT

A washer fluid reservoir assembly for a vehicle includes a washer fluid reservoir, a support member extending from the washer fluid reservoir, and a hold feature connected to the support member forming a hook configured to hang the washer fluid reservoir assembly.

12 Claims, 6 Drawing Sheets

(56)     References Cited

U.S. PATENT DOCUMENTS

| 2024/0278749 A1* | 8/2024 | Weinman | .................. | B60S 1/50 |
| 2025/0222901 A1* | 7/2025 | Robertson | ................ | B60S 1/50 |

FOREIGN PATENT DOCUMENTS

| JP | 2005297804 | A | | 10/2005 | | |
| JP | 2007098961 | A | | 4/2007 | | |
| JP | 2011251662 | A | | 12/2011 | | |
| KR | 200160071 | Y1 | | 11/1999 | | |
| KR | 20030097072 | A | | 12/2003 | | |
| KR | 20050042324 | A | * | 5/2005 | ............... | B60S 1/50 |
| KR | 100656024 | B1 | | 12/2006 | | |

* cited by examiner

WASHER FLUID RESERVOIR ASSEMBLY INCLUDING A HOLD FEATURE

BACKGROUND

1. Field of the Disclosure

The present disclosure relates to a washer fluid reservoir assembly for a vehicle, and more particularly to a vehicle washer fluid assembly with a hold feature.

2. Description of Related Art

Motor vehicles often have washer fluid reservoirs for holding a supply of a liquid, such as water, or a water-methanol solution. The liquid can be sprayed onto a surface to clean the surface. For example, a vehicle may include a pump configured to draw the liquid from the washer fluid reservoir and spray a windshield, a rear-window, or headlight with the liquid through a washer nozzle.

The washer fluid reservoir may be located in any of a number of areas within a vehicle. The washer fluid reservoir is typically disposed in an area with convenient access for refilling the liquid in the washer fluid reservoir. However, the washer fluid reservoir may also need to be disposed away from electrical components of the vehicle, such as a battery, and away for sources of heat, such as an engine block or exhaust manifold. In some applications, the washer fluid reservoir may be disposed between a wheel arch and a fender. Installation of the washer fluid reservoir may be difficult due to placement considerations such as those described herein.

There is a need in the art for a washer fluid reservoir having a temporary hold feature.

SUMMARY OF THE INVENTION

The present disclosure is directed to improvements in a vehicle washer reservoir. In one aspect, a washer fluid reservoir assembly for a vehicle may include a washer fluid reservoir, a support member extending from the washer fluid reservoir, and a hold feature connected to the support member forming a hook configured to hang the washer fluid reservoir assembly.

In some aspects, the washer fluid reservoir assembly may further include a mounting point in the support member configured to receive a fixing means.

In some aspects, the hold feature may include a first projection extending from the support member, and a second projection extending from the first projection.

In some aspects, the first projection may extend perpendicular from the support member and the second projection may extend parallel to, and over, the support member.

In some aspects, the hold feature may be configured to capture a structure of the vehicle to hang the washer fluid reservoir assembly.

In some aspects, the structure of the vehicle may not include a hole for receiving the hold feature.

In some aspects, the support member may include a first mounting point.

In some aspects, the hold feature may locate the first mounting point of the support member at a second mounting point of a structure of the vehicle and the washer fluid reservoir assembly may further include a fixing means passing through the first mounting point and the second mounting point.

In some aspects, the fixing means may be a bolt and the structure of the vehicle may include a nut receiving the bolt, wherein the bolt and the nut cooperate to hold the support member to the structure of the vehicle.

In some aspects, a washer fluid reservoir assembly for a vehicle may include a washer fluid reservoir, a support member extending from the washer fluid reservoir and including a first mounting point, and a hold feature extending from the support member and around a structure of the vehicle, wherein the structure of the vehicle includes a second mounting point and the support member is fixed to the structure of the vehicle by a fixing means.

In some aspects, the hold feature may include a first projection extending from the support member, and a second projection extending from the first projection, wherein the support member, the first projection and the second projection may receive an end portion of the structure of the vehicle.

In some aspects, the first projection may extend perpendicular from the support member and the second projection may extend parallel to, and over, the support member.

In some aspects, the hold feature may be configured to hang the washer fluid reservoir assembly from the structure of the vehicle.

In some aspects, the hold feature may be configured to locate the first mounting point of the support member at a second mounting point of the structure of the vehicle and the fixing means may pass through the first mounting point and the second mounting point.

In some aspects, the fixing means may be a bolt and the structure of the vehicle may include a nut receiving the bolt, wherein the bolt and the nut may cooperate to hold the support member to the structure of the vehicle.

In some aspects, the structure of the vehicle may not include a hole for receiving the hold feature.

In some aspects, a method of installing a washer fluid reservoir assembly in a vehicle includes locating a hold feature of the washer fluid reservoir assembly around a structure of the vehicle, wherein locating the hold feature aligns a first mounting point of the washer fluid reservoir assembly with a second mounting point of the structure of the vehicle and wherein locating the hold feature hangs the washer fluid reservoir assembly from the structure of the vehicle, and securing the washer fluid reservoir assembly to the structure using a fixing means through the first mounting point and the second mounting point.

In some aspects, the structure of the vehicle may not include a hole for receiving the hold feature.

In some aspects, locating the hold feature may include bringing the hold feature into contact with the structure of the vehicle.

In some aspects, securing the washer fluid reservoir assembly to the structure using the fixing means through the first mounting point and the second mounting point may bring the hold feature apart from the structure of the vehicle.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

An improved washer fluid reservoir according to an embodiment will be described with reference to the drawings.

Figure 1:
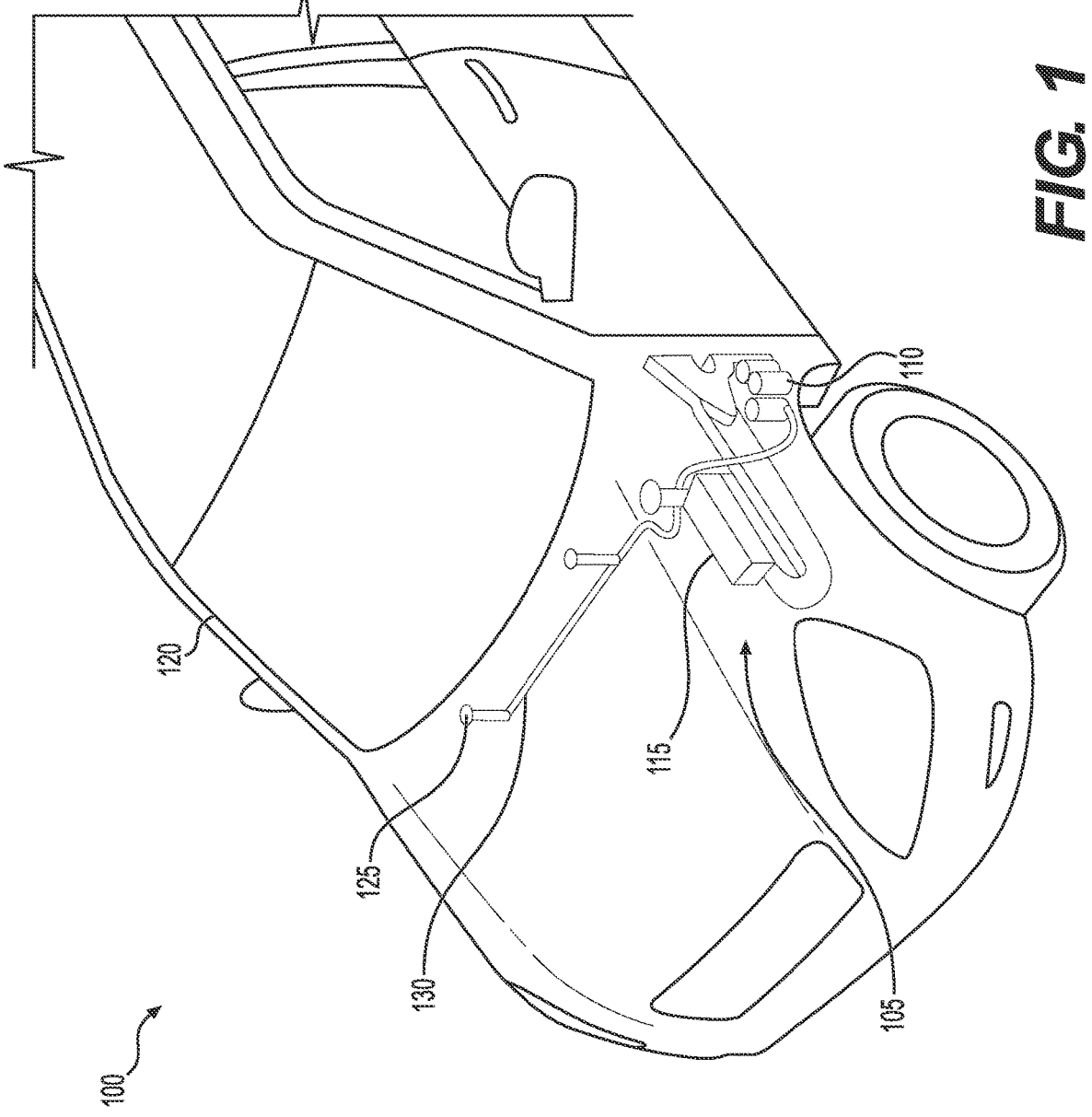
FIG. 1 illustrates an embodiment of a vehicle having a washer fluid reservoir assembly according to some embodiments.

As illustrated in FIG. 1, a vehicle 100 is, for example, a passenger vehicle. Embodiments are applicable to any vehicle having a washer fluid reservoir. FIG. 1 illustrates an embodiment of the vehicle 100 having a washer fluid reservoir assembly 105 according to some embodiments. The washer fluid reservoir assembly 105 may be located in the vehicle 100. The washer fluid reservoir assembly 105 may be located, for example, between a fender and a wheel well liner of the vehicle 100, behind a bumper cover of the vehicle 100, or on a firewall bulkhead of the vehicle 100. The washer fluid reservoir assembly 105 may be associated with a pump 110 configured to draw a liquid from a washer fluid reservoir 115 of the washer fluid reservoir assembly 105 and spray a windshield 120, a camera, a rear-window, or headlight with the liquid through a washer nozzle 125. The washer nozzle 125 may be connected to the pump 110 by a tube 130.

According to some aspects, the washer fluid reservoir assembly 105 includes a locating feature. In some aspects, the locating feature may be used to hold the washer fluid reservoir assembly 105 in a position until additional components of the vehicle are installed. In some aspects, the locating feature may be used to hold the washer fluid reservoir assembly 105 in a position until a final placement of the washer reservoir can be achieved during the manufacture of the vehicle. In some aspects, the locating feature may be used to hold the washer fluid reservoir assembly 105 in a position until a next intermediate placement of the washer reservoir can be achieved during the manufacture of the vehicle. In some cases, the locating feature may be used in a repair context.

Existing washer reservoirs may need to be manually held in place or temporarily mounted to a hole in the vehicle body using a locating pin extending into the hole. The hole in the vehicle body may create a weak point in a structure of the vehicle.

In some examples, the washer fluid reservoir assembly 105 may be temporarily held in position without the use of a hole in the structure of the vehicle 100, for example, where the hole may be used for receiving a locating pin. For example, according to some embodiments, the washer fluid reservoir assembly 105 may be temporarily held in position without the use of a hole in a body of the vehicle. In another example, the washer fluid reservoir assembly 105 may be temporarily held in position without the use of a hole in a frame of the vehicle 100.

Figure 2:
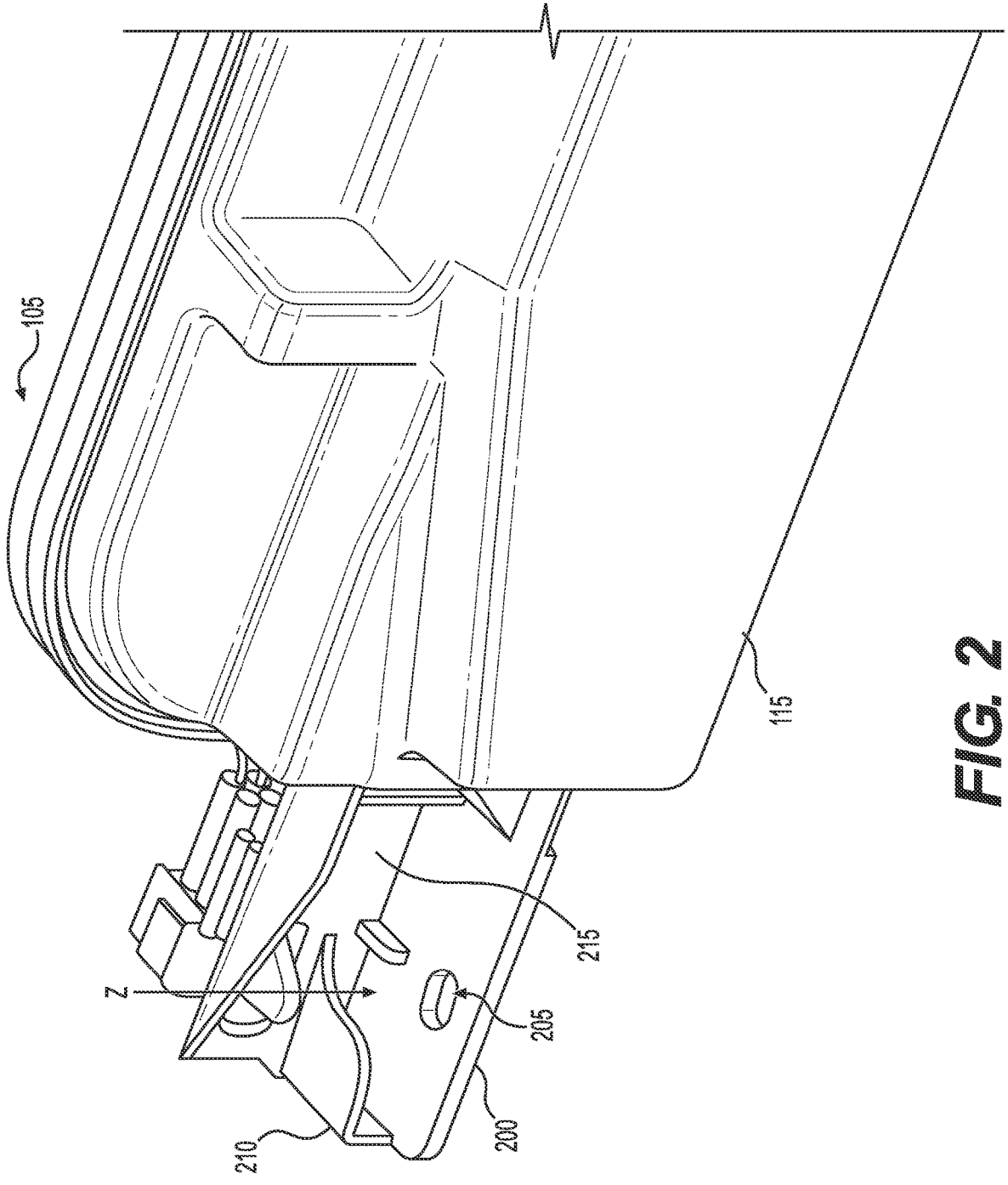
FIG. 2 illustrates an embodiment of a washer fluid reservoir assembly according to some embodiments.

FIG. 2 illustrates an embodiment of the washer fluid reservoir assembly 105 according to some embodiments. The washer fluid reservoir assembly 105 includes a washer fluid reservoir 215, a support member 200, a first mounting point 205 in the support member 200, and a hold feature 210. The first mounting point 205 in the support member 200 may be configured to receive a fixing means, such as a bolt, permanently fixing the washer fluid reservoir assembly 105 to a structure of the vehicle. The washer fluid reservoir assembly 105 may be permanently fixed to structures of the vehicle including, for example, a fender, a ladder frame, a unibody frame, or a firewall bulkhead.

Figure 3:
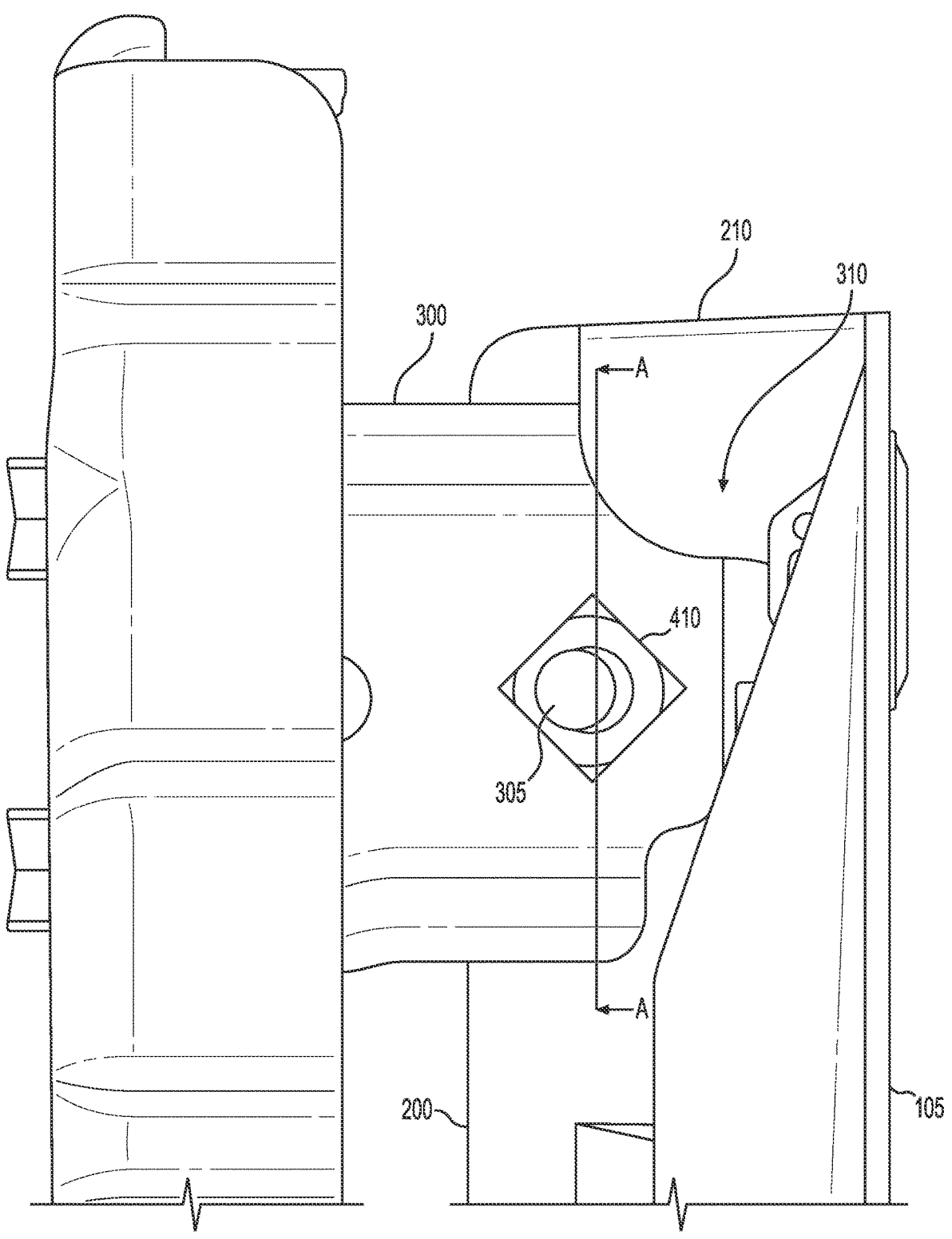
FIG. 3 illustrates an embodiment of a washer fluid reservoir assembly having a hold feature according to some embodiments.

FIG. 3 illustrates an embodiment of the washer fluid reservoir assembly 105 having a hold feature 210 according to some embodiments. FIG. 3 illustrates a view "Z" indicated in FIG. 2 according to some embodiments. The washer fluid reservoir assembly 105 may be fixed to a structure 300 of the vehicle using a bolt 305 through the first mounting point of the support member 200 and a second mounting (see second mounting point 445, FIG. 4) point of the structure 300.

The structure 300 is illustrated as a bracket. In some aspects, the structure 300 may be another component of the vehicle. For example, the structure 300 may be a fender, a wheel well liner, a ladder frame, a unibody frame, or a firewall bulkhead. The structure 300 may be formed of a material such as a metal, a plastic, or a composite. In some aspects, the structure 300 includes an end portion that may be received by the hold feature 210. For example, the structure 300 may not include a hole configured to temporarily position the washer fluid reservoir assembly 105 before the washer fluid reservoir assembly 105 may be secured to the vehicle, for example, using the bolt 305.

Figure 4:
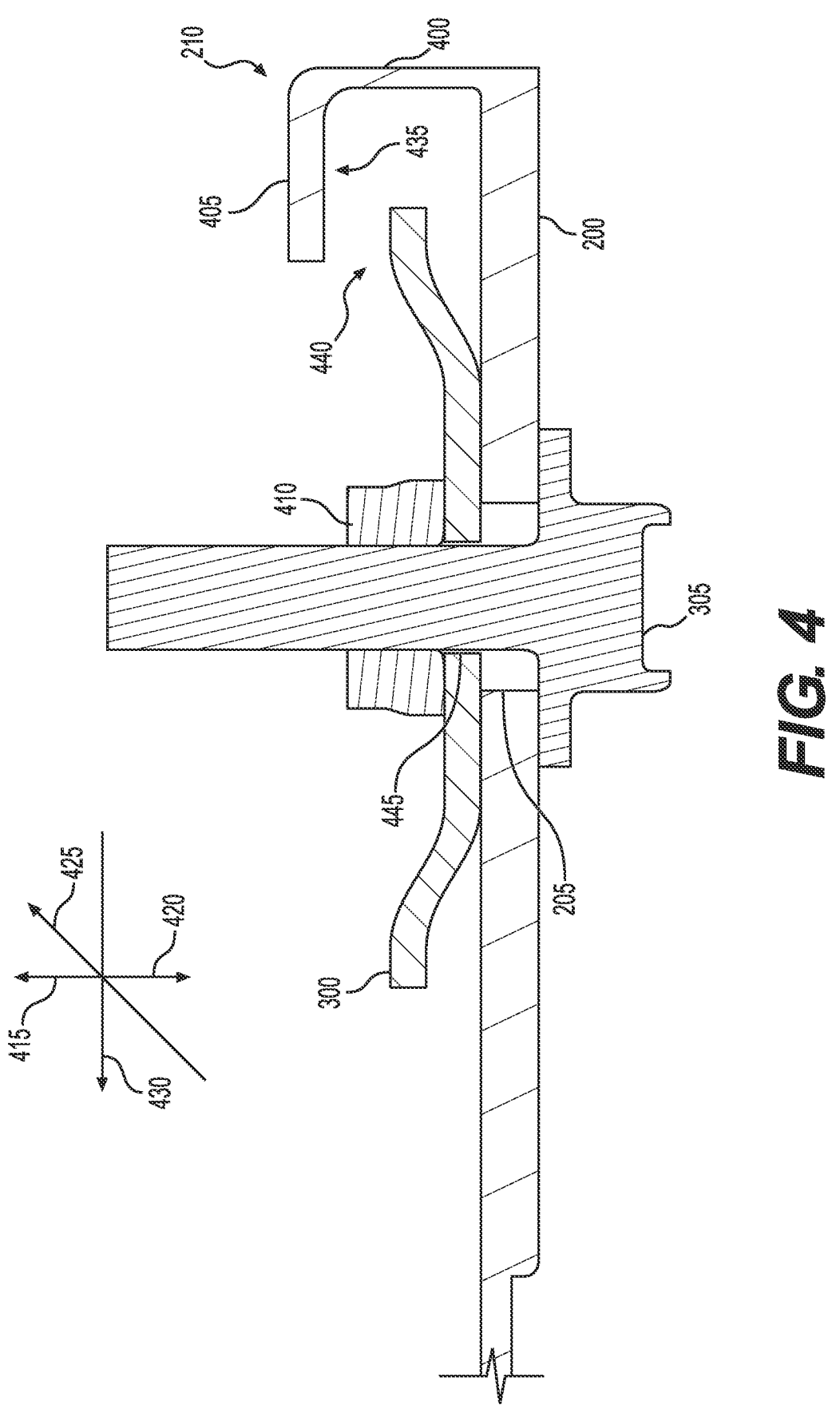
FIG. 4 illustrates an embodiment of a construction of a hold feature according to some embodiments.

In some examples, the hold feature 210 receives at least an end portion of the structure 300. For example, the hold feature 210 may maintain a position of the washer fluid reservoir assembly 105 relative to the structure 300, even before the washer fluid reservoir assembly 105 has been permanently attached to the structure 300. For example, the hold feature 210 may maintain the position of the washer fluid reservoir assembly 105 relative to the structure 300, until the washer fluid reservoir assembly 105 has been permanently attached to the structure 300 using a fixing means, such as a bolt, a screw, or push-in rivets. FIG. 4 illustrates an embodiment of a construction of a hold feature 210 according to some embodiments. FIG. 4 illustrates a cross-section "A-A" indicated in FIG. 3 according to some embodiments. In some aspects, the hold feature 210 extends from the support member 200. In some aspects, the hold feature 210 includes a first projection 400 extending from the support member 200 and a second projection 405 extending from the first projection 400. In some aspects, the first projection 400 extends at an angle from the support member 200. For example, the first projection 400 may extend at a right angle from the support member 200. In some aspects, the second projection 405 extends at an angle from the first projection 400. For example, the second projection 405 may extend at a right angle from the first projection 400. In some examples, the first projection 400 may extend perpendicular from the support member 200 and the second projection 405 may extend parallel to, and over, the support member 200.

In some aspects, the hold feature 210 includes the first projection 400 extending upwards from the support member 200 and the second projection 405 extending perpendicular from the first projection 400 and parallel to the support member 200. For example, the support member 200 and the hold feature 210 may form a "C" shape. More particularly, the first projection 400 may be an end portion of the hold feature 210, and the second projection 405 may extend away from the end portion and towards the washer fluid reservoir assembly 105.

As illustrated in FIG. 2 and FIG. 3, the washer fluid reservoir assembly 105 may include a wall 215. In some aspects, the wall 215 extends from the washer fluid reservoir 115. The wall 215 may be disposed perpendicular to the support member 200. According to some aspects, the wall 215 may close a first side of the hold feature 210. For example, the first side may be a back side of the C shape at the wall 215. In some aspects, a second side of the hold feature 210 is open and configured to receive an end portion of the structure 300. The structure 300, having the end portion inserted into the hold feature 210, may not extend beyond the wall 215. For example, the wall 215 may function to locate the first mounting point of the support member 200 and the second mounting point of the structure 300 to receive the bolt 305.

As illustrated in FIG. 3, the second projection 405 may have a radius 310 extending from the first projection 400 to the wall 215. In some examples, the second projection 405 may be formed as a triangular shape extending from the wall 215 to the first projection 400, or a rectangular shape, or another shape.

Referring again to FIG. 4, the first mounting point 445 of the support member 200 and the second mounting point 205 of the structure 300 may receive the bolt 305. That is, the bolt 305 may pass through the first mounting point 445 of the support member 200 and the second mounting point 205 of the structure 300. The washer fluid reservoir assembly 105 may include a nut 410 (see also FIG. 3). The nut 410 may receive the bolt 305. For example, the bolt 305 and the nut 410 may cooperate to secure the support member 200 to the structure 300. In some aspects, the nut 410 may be a weld nut. For example, the nut 410 may be welded to the structure 300. In some examples, the nut 410 may be spot welded to the structure 300. In a case where the nut 410 is secured to the structure 300, for example, by a weld, the weld may prevent the nut 410 from rotating as the bolt 305 is tightened onto the nut 410. Other structures for securing the support member 200 to the structure 300 may be used. For example, in at least one aspect, the nut 410 may be omitted and the second mounting point 445 of the structure 300 may be a threaded opening configured to receive the bolt 305.

As illustrated in FIG. 4, the hold feature 210 at least partially encircles the structure 300. For example, the second projection 405 extending perpendicular from the first projection 400 and parallel to the support member 200 may extend a distance to overlap the structure 300. For example, the C shape of the hold feature 210 may cooperate with the support member 200 to locate the washer fluid reservoir assembly 105. In some examples, the C shape of the hold feature 210 may cooperate with the support member 200 and the wall 215 to locate the washer fluid reservoir assembly 105, for example, in one or more of a first direction 415, a second direction 420, a third direction 425, and a fourth direction 430.

Figure 5:
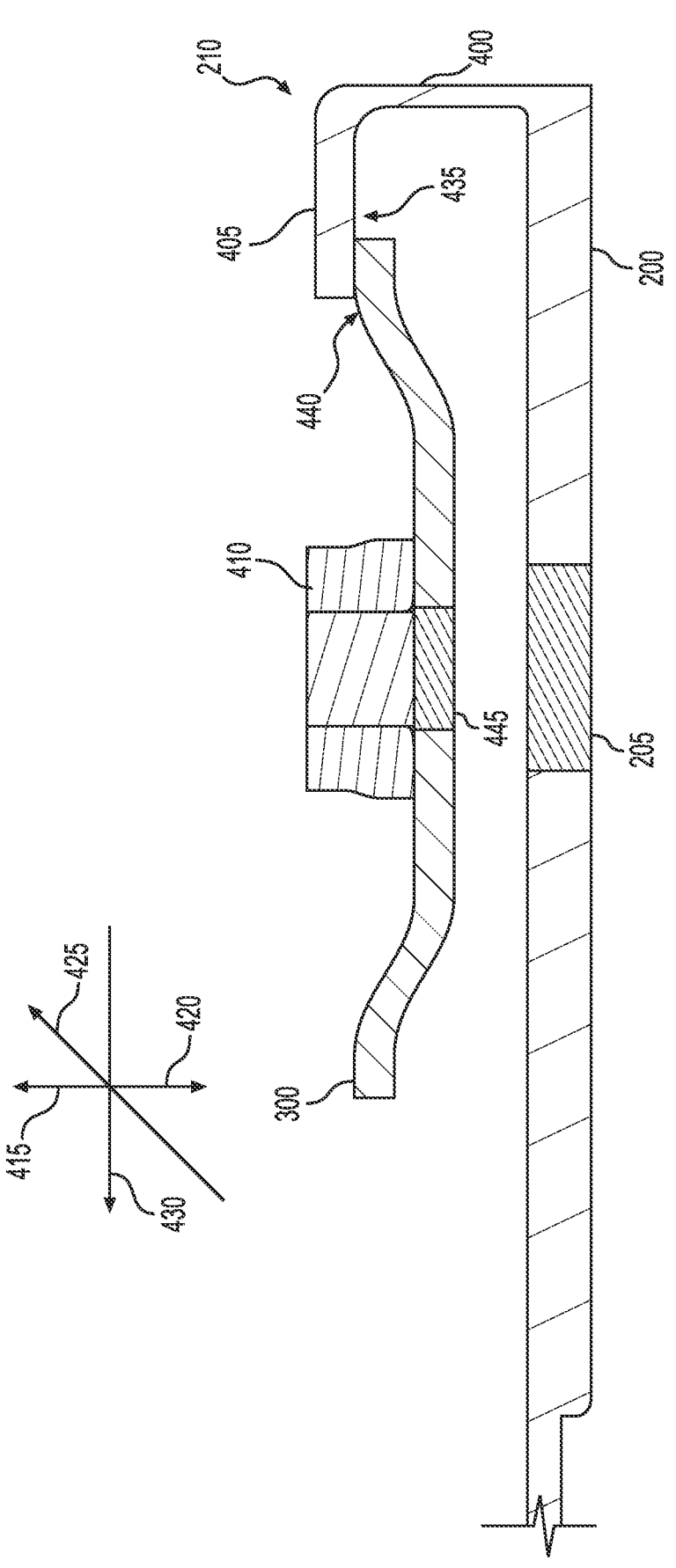
FIG. 5 illustrates an embodiment of a construction of a hold feature according to some embodiments.

In some aspects and as illustrated in FIG. 5, at a time before the support member 200 is secured to the structure 300, a weight of the washer fluid reservoir assembly 105 may rest the hold feature 210 on the structure 300 and temporarily hold the washer fluid reservoir assembly 105 in at least the first direction 415 until the washer fluid reservoir assembly 105 may be fixed to the structure 300, for example, using the bolt 305 (see FIG. 4). In this example, a bottom surface 435 of the second projection 405 may be configured to rest on a top surface 440 of the structure 300 in a temporary hold configuration, for example, until the washer fluid reservoir assembly 105 can be fixed in place using the bolt 305.

In some aspects, the structure 300 may have lateral ends that rise away from a middle portion of the structure 300, wherein a lower surface of the structure 300 around the second mounting point 445 may be brought into direct contact with an upper surface of the support member around the first mounting point 205. That is, the top surface 440 of the structure 300 at the lateral ends may be higher than a top surface of the structure near the second mounting point 445. In at least one aspect, the structure 300 may be flat, wherein the lower surface of the structure 300 at the lateral ends may be brought into direct contact with the surface of the support member around the first mounting point 205. In yet another aspect, the structure 300 may include vertical projections at the lateral ends, projecting from a top surface of the structure 300 toward the bottom surface 435 of the second projection 405. As described herein, while the structure 300 is illustrated as a bracket, the structure 300 may be another component of the vehicle configured to cooperate with the hold feature 210.

In some aspects and as illustrated in FIG. 4, by securing the support member 200 to the structure 300 using the bolt 305 through the first mounting point 205 and the second mounting point 445, the bottom surface 435 of the second projection 405 may be brought apart from top surface 440 of the structure 300.

As illustrated in FIGS. 2-4, the hold feature 210 of the washer fluid reservoir assembly 105 may utilize existing geometries of the vehicle to engage the washer fluid reservoir assembly 105 with the vehicle. For example, the washer fluid reservoir assembly 105 may be engaged with the vehicle even before the washer fluid reservoir assembly 105 is fixed to the vehicle by, for example, the bolt 305. In some aspects, the hold feature 210 may be a hook for hanging the washer fluid reservoir assembly 105 on the vehicle. For example. the hold feature 210 may be configured to capture the structure 300 of the vehicle.

Figure 6:
FIG. 6 illustrates an embodiment of method for installing a washer fluid reservoir assembly having a hold feature according to some embodiments.

FIG. 6 illustrates an embodiment of method for installing a washer fluid reservoir assembly having a hold feature according to some embodiments. A method 600 of installing a washer fluid reservoir assembly in a vehicle comprises locating a hold feature at step 605 of the washer fluid reservoir assembly around a structure of the vehicle, wherein locating the hold feature aligns a first mounting point of the washer fluid reservoir assembly with a second mounting point of the structure of the vehicle and wherein locating the hold feature hangs the washer fluid reservoir assembly from the structure of the vehicle, and securing the washer fluid reservoir assembly to the structure at step 610 using a fixing means through the first mounting point and the second mounting point. In some aspects, the structure of the vehicle does not include a hole for receiving the hold feature. In some aspects, locating the hold feature at step 605 comprises bringing the hold feature into contact with the structure of the vehicle. In some aspects, securing the washer fluid reservoir assembly to the structure at step 610 using the fixing means through the first mounting point and the second mounting point brings the hold feature apart from the structure of the vehicle.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

We claim:

1. A vehicle comprising:
a vehicle structure having a first mounting point; and
a washer fluid reservoir assembly, including:
a washer fluid reservoir;
a support member extending from the washer fluid reservoir; and
a hold feature connected to the support member and forming a hook configured to hang the washer fluid reservoir assembly without the use of fasteners;
wherein the hold feature is configured to locate a second mounting point of the support member at the second mounting point of the vehicle structure such that a fastener may be passed through the first mounting point and the second mounting point to secure the washer fluid reservoir assembly to the vehicle structure.

2. The vehicle of claim 1, further comprising a mounting point in the support member configured to receive a fixing means.

3. The vehicle of claim 1, wherein the hold feature comprises:
a first projection extending from the support member; and
a second projection extending from the first projection.

4. The vehicle of claim 3, wherein the first projection extends perpendicular from the support member and the second projection extends parallel to, and over, the support member.

5. The vehicle of claim 1, wherein the hold feature is configured to capture a structure of the vehicle to hang the washer fluid reservoir assembly.

6. A vehicle comprising:
a vehicle structure having a first mounting point; and
a washer fluid reservoir assembly, including:
a washer fluid reservoir;

a support member extending from the washer fluid reservoir and including a second mounting point; and
a hold feature extending from the support member and around the vehicle structure;
wherein the support member is fixed to the structure of the vehicle by a fastener passing through the first mounting point and the second mounting point; and
wherein the hold feature is held apart from the vehicle structure.

7. The vehicle of claim 6, wherein the hold feature comprises:
a first projection extending from the support member; and
a second projection extending from the first projection,
wherein the support member, the first projection and the second projection receive an end portion of the vehicle structure.

8. The vehicle of claim 7, wherein the first projection extends perpendicular from the support member and the second projection extends parallel to, and over, the support member.

9. The vehicle of claim 6, wherein the hold feature is configured to hang the washer fluid reservoir assembly from the vehicle structure.

10. The vehicle of claim 6, wherein the hold feature is configured to locate the first mounting point of the support member at a second mounting point of the vehicle structure to facilitate passing of the fastener through the first mounting point and the second mounting point.

11. The vehicle of claim 10, wherein the fastener is a bolt and the vehicle structure comprises a nut receiving the bolt, wherein the bolt and the nut cooperate to hold the support member to the vehicle structure.

12. A method of installing a washer fluid reservoir assembly in a vehicle comprising:
locating a hold feature of the washer fluid reservoir assembly around a structure of the vehicle, wherein locating the hold feature aligns a first mounting point of the washer fluid reservoir assembly with a second mounting point of the structure of the vehicle and wherein locating the hold feature hangs the washer fluid reservoir assembly from the structure of the vehicle; and
securing the washer fluid reservoir assembly to the structure by inserting a fastener through the first mounting point and the second mounting point;
wherein locating the hold feature comprises bringing the hold feature into contact with the structure of the vehicle; and
wherein securing the washer fluid reservoir assembly to the structure using the fastener through the first mounting point and the second mounting point brings the hold feature apart from the structure of the vehicle by upwardly translating the hold feature out of direct contact from the structure of the vehicle.

* * * * *